Patented Sept. 30, 1952

2,612,481

UNITED STATES PATENT OFFICE 2,612,481

PHENOL ALDEHYDE ADHESIVE CONTAINING A CHROMIUM COMPOUND

Charles N. Cone, Portland, Oreg., assignor to United States Plywood Corporation, New York, N. Y., a corporation of New York No Drawing. Application April 25, 1949, Serial No. 89,553

14 Claims. (Cl. 260—17.2)

The present invention relates to thermosetting, resinous adhesive compositions for use particularly in the manufacture of plywood by hot press methods. More specifically, the present invention relates to rapid setting, hot press plywood adhesives comprising phenol-aldehyde resinous condensation products modified with alkali soluble chromium compounds, for example potassium chromate.

In the plywood fabricating operation, the press time characteristics of a given adhesive are of primary significance in determining its successful application. By "press time" is meant the time required for the adhesive to transfer to the face veneers and set after it has been applied to the core veneers, the face veneers applied, and the assembly placed in the press and subjected to heat and pressure. Since the output of the mill is a function of the capacity of its presses, it will be apparent that any reduction in press time will increase the amount of plywood produced in a given operating period and reduce correspondingly the cost of the product. In view of the fact that each press is loaded and unloaded many times during an operating day, the reduction of the press time by even a fraction of a minute is of commercial significance.

Although various expedients have been tested for reducing the press time of the commercial thermosetting phenolic adhesives, these, if successful in reducing the press time, uniformly have affected disadvantageously one or more of the other properties of the adhesive mixture. For example, it is well known to advance the phenolic resin so that less time is required to effect its cure. However, advancing the resin substantially reduces its thermoplasticity with the result that it does not transfer well from the core veneer to the face veneers, especially at longer assembly times. Furthermore, the more highly advanced resins are quite viscous so that they do not spread readily on the core veneers. Hence it is necessary to dilute them with water to give them a spreadable consistency. The consequent reduction in solids increases the spreadability of the adhesive mixture, but, since it is accomplished through the agency of added water, the tendency to form blisters and to delaminate is greatly increased. Similarly, other expedients commonly employed to decrease the press time of an adhesive mixture are attended by offsetting disadvantages.

I have discovered that the cure of the resinous phenolic adhesives may be accelerated to a remarkable extent, and the press time of the adhesives correspondingly reduced, by the incorporation therein of a relatively minor proportion of an accelerator comprising a compound of the element chromium which is soluble in aqueous alkaline media. Such compounds are readily compatible with the usual commercial phenolic adhesives and, when contained therein, reduce the press time of the adhesives by as much as 20%. This is accomplished without increasing their tendency to form blisters during pressing, without decreasing their spreadability, and without exerting an adverse effect upon their transfer qualities or bonding properties.

In addition, the chromium-containing adhesives are applicable for use on relatively moist veneers, e. g. veneers having a moisture content of from 8% to 10%, without substantially increased hazard of blistering, and without the necessity of increasing the press time to compensate for the increased moisture content. As is well known, the conventional phenolic adhesives customarily are applied to veneers having a moisture content of but 2–3%. If the moisture content is increased materially above this level, the tendency toward blister formation is relatively great, and a corresponding increase in press time is required.

The accelerating action of chromium compounds upon phenolic resinous adhesives is applicable broadly to such materials as a class. Suitable resinous adhesives therefore include those having as a resin base the resinous condensation products of the aldehydes with phenol, ortho cresol, meta cresol, para cresol, resorcinol, the xylenols, and the higher phenols. Also included are the resinous condensation products of the phenols with aldehydes other than formaldehyde, examples being acetaldehyde, furfural, the substituted furfurals, and the like. Also comprehended are the interpolymers of these materials and mixtures of the polymerized materials.

Although the phenol-aldehyde resins may be employed in the solid state, as by dissolving or dispersing them in alkaline solutions, it is preferred to employ them in the form of the alkaline dispersions which are commercially available, usually as dispersions containing about 40% by weight of phenol aldehyde resin and having a pH of about 10 or 12. In view of the accelerating effect of the added chromium compounds, the resins may be used in a relatively low state of advancement.

As indicated above, the chromium compounds which are soluble in aqueous alkali media, termed herein "alkali-soluble chromium compounds," are applicable broadly as a group for the purposes of the present invention. Suitable chromium compounds therefore include those in which chromium appears in any of its valence states either as a cation or as an anion. Representative chromic compounds comprise chromic oxide, chromic nitrate, chromic hydroxide, chromic chloride, chromic sulfate, potassium chromium sulfate (chrome alum) and the like. Also suitable is a chrome solution similar to that used in tanning and prepared by reducing in aqueous alkaline medium a dichromate such as sodium dichromate with a suitable reducing agent, the procedure therefor being set forth in detail in the examples hereinbelow. The chromous compounds are the full equivalent of the chromic compounds for the purposes of the invention, since under ordinary conditions they are spontaneously oxidized to chromic compounds. As is well known to one skilled in the art, the foregoing water soluble chromic compounds in alkaline solutions such as comprise the media for the resinous phenolic adhesives are converted in greater or lesser degree to soluble chromites.

Further suitable for the purposes of the present invention are the compounds of chromium in which the chromium is hexavalent. These include chromium trioxide (chromic anhydride), chromic acid, dichromic acid, sodium chromate, potassium chromate, ammonium chromate, sodium ammonium chromate, potassium ammonium chromate, sodium dichromate, potassium dichromate, ammonium dichromate, sodium ammonium dichromate, potassium ammonium dichromate, and the like. These compounds, if not already in such state, tend to be converted to chromates in the aqueous alkaline resinous adhesive mixtures by well known reactions.

Other materials which may be admixed with the phenol aldehyde resin and the alkali soluble chromium compound in formulating my herein described adhesive compositions include an alkaline material, water, and solid fillers. The alkaline material serves to dissolve the phenolic resin, to dissolve the chromium compound if the latter already is not in solution, to promote the dispersion of the solid filler in the mixture and form a blend of uniform composition, and to catalyze the setting of the resin to form the final bond. Suitable alkaline materials comprise particularly the basic acting compounds of the alkali metals, for example the alkali metal hydroxides, mixtures thereof, and substances such as sodium carbonate which in solution hydrolize to form an alkali metal hydroxide. These are used in amounts sufficient to accomplish the above purposes, this amount being defined herein as "a solubilizing quantity," since in general the amount of alkaline material which is sufficient to dissolve the phenolic resin and the chromium compound and to form a uniform blend will be sufficient also to catalyze the reaction. Where the water soluble chromates and dichromates, and the commercial alkaline water base phenolic resins having a pH of from about pH 11 to about pH 12 are employed, it usually is not necessary to add a further quantity of alkali. However, with certain compositions, particularly those which are highly extended with solid fillers, additional amounts of alkaline material may be added as required to provide a uniform blend of desired setting qualities.

In addition, solid fillers such as walnut shell flour, wood flour, clay, etc., may be added in the amount calculated to secure the desired extension of the phenolic resins. Water may be added as necessary to produce a spreading viscosity and to secure further extension of the resin, not enough being added, however, to induce the formation of blisters during pressing.

The relative proportions of phenol aldehyde resin and chromium compound are variable depending upon the adhesive specifications it is desired to meet. In general, the accelerating effect of the chromium compound is roughly proportional to the amount in which it is used, the greater the amount, the greater being the accelerating effect. Hence the addition of even a relatively minor proportion of the chromium compound may be advantageous. The upper limit of its use is determined to a large extent by the sensitivity of the phenolic resin to its action. Any amount may be used up to the point where the resin sets so rapidly as to be inapplicable in the pressing operation contemplated, or where its bonding action is destroyed. Such an amount is termed herein "an accelerating quantity." In general this is from about 0.1 part to about 5.0 parts by weight of chromium compound (expressed as chromium) for each 200 parts by weight (solids basis) of phenolic resin.

A preferred range of proportions of the foregoing constituents of the adhesive compositions of the present invention and a specific formulation are given in Table I, wherein parts are expressed as parts by weight.

*Table I*

|  | Preferred Range | Specific Formulation |
|---|---|---|
| Phenol Aldehyde Resin (Solids Basis) | 200 | 200 |
| Chromium Compound (Expressed as Chromium) | 0.1–5.0 | 0.7 |
| Solid Filler (e. g. Walnut Shell Flour) | 20–200 | 80 |
| Water | 250–650 | 350 |
| Alkali | (¹) | (¹) |

¹ Solubilizing quantity.

In formulating the accelerated adhesive compositions of the present invention, the constituents thereof may be variously added to each other in order to produce the final composition. It is preferred, however, to add the chromium compound as a relatively dilute aqueous solution at normal room temperature to the aqueous solution of the phenolic resin, since when the chromium compound is added as a solid, or in concentrated solution, or at elevated temperatures, its activity is so great as to cause localized curing of the resin in the adhesive mixture. This effect does not appear harmful if it does not occur to an excessive degree. However, for obvious reasons, it is not desirable to cure the resin until it cannot be applied to the veneers in conventional equipment, or until it will not set further upon the application of heat and pressure in the presses.

Thus a typical method of formulating the hereindescribed adhesives comprises dissolving a solid phenol aldehyde resin in the predetermined amount of aqueous alkali, for example aqueous sodium hydroxide, dissolving the chromium compound in the predetermined amount of water or aqueous alkali, and then admixing the resulting solutions. The mixing operation may be effected in conventional mixing equipment and preferably is carried out at normal room temperature, with cooling if necessary, and with sufficient speed to prevent the formation of localized concentrations of chromium compound. This might result in the over-advancement of part of the resin and the formation of a solid precipitate in the adhesive mixture as explained above.

The hereindescribed chromium-modified phenolic adhesives and their method of formulation and application are illustrated further in the following examples, where parts are expressed as parts by weight.

Example 1

The following example illustrates the use of sodium dichromate as an accelerator for phenol aldehyde resinous adhesives.

500 parts of phenol formaldehyde resin in an aqueous alkaline dispersion having a solids content of about 40% by weight was placed in a mixer together with 80 parts walnut shell flour. These two constituents were stirred vigorously for three minutes. 2 parts sodium dichromate dissolved in 80 parts water then was added and the mixing continued until the composition was of uniform consistency. It then was ready for use.

A quantity of the adhesive composition prepared as indicated in the above paragraph was applied to the production of 1⅜ inch five-ply Douglas fir plywood panels using a press temperature of 285° F., a pressure of 175 p. s. i., and a press time of 7 minutes. Satisfactory bonding was obtained at this press time, and the panel produced conformed to exterior grade plywood specifications. Using substantially the same formulation but omitting the sodium dichromate, a press time of 8½ minutes was required.

In a manner similar to the foregoing, resinous adhesive compositions are prepared and applied using in place of the phenol formaldehyde resin, a cresol formaldehyde resin or a resorcinol formaldehyde resin; and using in place of the sodium dichromate, potassium dichromate, ammonium dichromate, sodium chromate, potassium chromate, or ammonium chromate.

Example 2

The following example illustrates the use of an increased amount of chromium compound in the compositions of the present invention.

500 parts of an aqueous alkaline phenolic resin solution having a solids content of about 40% by weight was mixed with 80 parts walnut shell flour until the latter was thoroughly wetted and interspersed throughout the resin solution. 8 parts sodium dichromate dissolved in 80 parts water then was added to the mixture, and the mixing continued. Since this resulted in a slight thickening of the composition, 4.5 parts sodium hydroxide dissolved in 4.5 parts water was combined with the mixture. This resulted in the formation of a composition of a suitable spreading viscosity.

The foregoing composition was applied to the production of $\frac{3}{16}$ inch, 5-ply wood veneer panels by applying it to the veneers in conventional manner, followed by pressing at 275° F. and 175 p. s. i. Substantial bonding of the veneers was obtained even when press times of as low as four minutes were employed.

As a control, a composition comprising 500 parts phenol-formaldehyde liquid resin (40% solids), 80 parts walnut shell flour and 80 parts water was prepared as described above and used in the production of plywood panels under identical conditions. No bonding at all was obtained at a press time of four minutes, the panels delaminating completely upon removal from the press.

Example 3

This example illustrates the application of trivalent chromium compounds in the presently described adhesive compositions.

A chrome solution was prepared by dissolving 20 parts sodium dichromate and 8 parts dextrose (or its equivalent in formaldehyde or other reducing agent) in 40 parts water. This was mixed with stirring with a cold solution of 8 parts sodium hydroxide dissolved in 8 parts water.

500 parts of phenol formaldehyde resin solution having a solids content of 40% by weight and a pH of 11.5 was mixed with 80 parts walnut shell flour, 10 parts of the above chrome solution, and 75 parts water, these constituents being added in the given order and stirred after each addition. When the resulting composition was applied to the production of plywood panels as described above, a marked accelerating effect of the chromium compound on the setting of the resin again was observed.

Example 4

The following example illustrates the use of chromic chloride in the compositions of the invention.

An accelerated adhesive composition was formulated using a procedure identical with that set forth in Example 2, except that 8 parts chromic chloride ($CrCl_3.6H_2O$) were used in place of the 8 parts of sodium dichromate of that example, and a solution of 12.5 parts sodium hydroxide dissolved in 12.5 parts water was added at the conclusion of the mixing process to produce a suitable spreading viscosity. The resulting composition then was applied to the production of plywood panels, again following the procedure of Example 2. Bonding of the veneers again resulted, even at a press time of but four minutes, while complete delamination occurred when using a control composition in which the chromium compound had been omitted.

Although the foregoing examples have specific reference to the use of adhesives in the manufacture of plywood, it will be apparent that, with suitable adjustment of pressing technique and composition, they also may be applied to the bonding together of a wide variety of materials. They may be applied, for example, to the bonding of cellulosic fibers in the production of consolidated fibrous products such as hardboard. In this application, a suitable quantity (e. g. 2–5% by weight) of liquid phenolic resin binder containing an accelerating quantity of chromium compound is mixed thoroughly with the cellulosic fiber by spraying, tumbling in a mill, or otherwise. The treated fiber then is formed into a felt by either wet-forming or dry-forming techniques, and the felt pressed between the heated platens of an hydraulic press at pressures of between about 200 p. s. i. and about 700 p. s. i. and temperatures of between about 225° C. and about 300° C. Incorporation of the chromium compound in the binder materially decreases the time required under these conditions for the cementing together of the fibers and the formation of a hard, dense, consolidated product.

Hence it will be apparent that, by the present invention, I have provided rapid setting phenolic compositions which cure in the press much more rapidly than do the conventional adhesives, thus enabling a substantial increase in production with given press installations. Furthermore, this decreased press time is obtained while still retaining the desirable qualities of transfer and spreadability which are required of the adhesives in the usual applications. The application of the adhesives and the pressing of the laid up assemblies may be carried out in conventional equipment without increased hazard of blister formation. These various advantages are secured, furthermore, by means of a simple expedient easily used at low cost.

Having now described my invention in preferred embodiments, I claim as new and desire to protect by Letters Patent:

1. The rapid setting adhesive composition comprising a thermosetting phenol-aldehyde resin, a chromium compound soluble in aqueous alkaline media, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Chromium compound, expressed as chromium | 0.1–5.0 |
| Filler | 20–200 |
| Water | 250–650 |
| Alkali metal hydroxide | Sufficient to adjust pH of composition to at least about 10. |

2. The rapid setting adhesive composition comprising a thermosetting phenol-formaldehyde resin, a chromium compound soluble in aqueous alkaline media, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Chromium compound, expressed as chromium | 0.1–5.0 |
| Filler | 20–200 |
| Water | 250–650 |
| Alkali metal hydroxide | Sufficient to adjust pH of composition to at least about 10. |

3. The rapid setting adhesive composition comprising a thermosetting phenol-formaldehyde resin, a chromate compound soluble in aqueous alkaline media, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Chromate compound, expressed as chromium | 0.1–5.0 |
| Filler | 20–200 |
| Water | 250–650 |
| Alkali metal hydroxide | Sufficient to adjust pH of composition to at least about 10. |

4. The rapid setting adhesive composition comprising a thermosetting phenol-formaldehyde resin, sodium chromate, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Sodium chromate, expressed as chromium | 0.1–5.0 |
| Filler | 20–200 |
| Water | 250–650 |
| Alkali metal hydroxide | Sufficient to adjust pH of composition to at least about 10. |

5. The rapid setting adhesive composition comprising a thermosetting phenol-formaldehyde resin, a dichromate compound soluble in aqueous alkaline media, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Dichromate compound, expressed as chromium | 0.1–5.0 |
| Filler | 20–200 |
| Water | 250–650 |
| Alkali metal hydroxide | Sufficient to adjust pH of composition to at least about 10. |

6. The rapid setting adhesive composition comprising a thermosetting phenol-formaldehyde resin, sodium dichromate, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Sodium dichromate, expressed as chromium | 0.1–5.0 |
| Filler | 20–200 |
| Water | 250–650 |
| Alkali metal hydroxide | Sufficient to adjust pH of composition to at least about 10. |

7. The adhesive composition of claim 6 wherein the filler comprises walnut shell flour and the alkali metal hydroxide comprises sodium hydroxide.

8. The rapid setting adhesive composition comprising a thermosetting phenol-formaldehyde resin, a chromic compound soluble in aqueous alkaline media, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Chromic compound, expressed as chromium | 0.1–5.0 |
| Filler | 20–200 |
| Water | 250–650 |
| Alkali metal hydroxide | Sufficient to adjust pH of composition to at least about 10. |

9. The rapid setting adhesive composition comprising a thermosetting phenol-formaldehyde resin, chrome alum, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Chrome alum, expressed as chromium | 0.1-5.0 |
| Filler | 20-200 |
| Water | 250-650 |
| Alkali metal hydroxide | Sufficient to adjust pH of composition to at least about 10. |

10. The rapid setting adhesive composition comprising a thermosetting cresol-formaldehyde resin, a chromium compound soluble in aqueous alkaline media, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Chromium compound, expressed as chromium | 0.1-5.0 |
| Filler | 20-200 |
| Water | 250-650 |
| Alkali metal hydroxide | Sufficient to adjust pH of composition to at least about 10. |

11. The rapid setting adhesive composition comprising a thermosetting cresol-formaldehyde resin, sodium dichromate, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Sodium dichromate, expressed as chromium | 0.1-5.0 |
| Filler | 20-200 |
| Water | 250-650 |
| Alkali metal hydroxide | Sufficient to adjust pH of composition to at least about 10. |

12. The rapid setting adhesive composition comprising a thermosetting resorcinol-formaldehyde resin, a chromium compound soluble in aqueous alkaline media, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Chromium compound, expressed as chromium | 0.1-5.0 |
| Filler | 20-200 |
| Water | 250-650 |
| Alkali metal hydroxide | Sufficient to adjust pH of composition to at least about 10. |

13. The rapid setting adhesive composition comprising a thermosetting resorcinol-formaldehyde resin, sodium dichromate, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Sodium dichromate, expressed as chromium | 0.1-5.0 |
| Filler | 20-200 |
| Water | 250-650 |
| Alkali metal hydroxide | Sufficient to adjust pH of composition to at least about 10. |

14. The rapid setting adhesive composition comprising a thermosetting phenol-formaldehyde resin, sodium dichromate, a solid filler comprising a member of the group consisting of a cellulose filler and clay, water, and an alkali metal hydroxide, the constituents being employed in substantially the following proportions, expressed in parts by weight on a solids basis;

| | |
|---|---|
| Resin | 200 |
| Sodium dichromate, expressed as chromium | 0.7 |
| Filler | 80 |
| Water | 350 |
| Alkali metal hydroxide | Sufficient to adjust pH of composition to at least about 10. |

CHARLES N. CONE.

REFERENCES CITED

The following references are of record in the file of this patent:

UNITED STATES PATENTS

| Number | Name | Date |
|---|---|---|
| 1,726,151 | Hole | Aug. 25, 1929 |

FOREIGN PATENTS

| Number | Country | Date |
|---|---|---|
| 16,896 | Australia | Dec. 3, 1929 |